(12) United States Patent
Schedler et al.

(10) Patent No.: US 7,752,728 B2
(45) Date of Patent: Jul. 13, 2010

(54) METHOD OF PRODUCING A MATERIAL COMPOSITE WITH EXPLOSION-WELDED INTERMEDIATE PIECE

(75) Inventors: Bertram Schedler, Reutte (AT); Thomas Huber, Breitenwang (AT); Thomas Friedrich, Halblech (DE); Karlheinz Scheiber, Breitenwang (AT); Dietmar Schedle, Reutte (AT); Anton Zabernig, Reutte (AT); Hans-Dieter Friedle, Häselgehr (AT); Sandra Mair, Reutte (AT); Nadine Wörle, Masau (AT)

(73) Assignee: Plansee SE, Ruette (AT)

( * ) Notice: Subject to any disclaimer, the term of this patent is extended or adjusted under 35 U.S.C. 154(b) by 728 days.

(21) Appl. No.: 11/518,845

(22) Filed: Sep. 11, 2006

(65) Prior Publication Data

US 2007/0056650 A1 Mar. 15, 2007

(30) Foreign Application Priority Data

Sep. 13, 2005 (AT) .............................. GM615/2005

(51) Int. Cl.
*B23P 17/00* (2006.01)
*B21C 37/08* (2006.01)
*B23K 20/08* (2006.01)
*B23K 15/00* (2006.01)
*F16L 9/22* (2006.01)

(52) U.S. Cl. .................. 29/421.2; 29/525.14; 72/367.1; 72/368; 228/107; 219/617; 219/643; 219/121.14; 219/121.64; 428/548; 428/615; 138/155

(58) Field of Classification Search ................ 29/421.2, 29/525.14; 72/367.1, 368; 228/107, 144, 228/170, 171, 183; 219/607, 612, 617, 643, 219/60.2, 101, 121.13, 121.14, 121.63, 121.64; 428/548, 615; 138/141, 155
See application file for complete search history.

(56) References Cited

U.S. PATENT DOCUMENTS

| 4,193,529 | A | | 3/1980 | Dick et al. |
| 4,564,433 | A | | 1/1986 | Werdecker et al. |
| 4,691,093 | A | * | 9/1987 | Banas et al. ........... 219/121.63 |
| 4,925,084 | A | | 5/1990 | Persson |
| 5,591,359 | A | * | 1/1997 | Saitou et al. ........... 219/121.64 |
| 5,749,414 | A | * | 5/1998 | Damsohn et al. ............ 165/178 |
| 6,492,037 | B2 | | 12/2002 | Shindo et al. |
| 2003/0031889 | A1 | | 2/2003 | Shindo et al. |

FOREIGN PATENT DOCUMENTS

| DE | 4241433 A1 | | 6/1994 |
| EP | 0 923 145 A2 | | 6/1999 |
| GB | 1248794 | | 10/1971 |
| JP | 53097964 A | * | 8/1978 |
| JP | 6-297162 | | 10/1994 |

* cited by examiner

*Primary Examiner*—Jermie E Cozart
(74) *Attorney, Agent, or Firm*—Laurence A. Greenberg; Werner H. Stemer; Ralph E. Locher

(57) ABSTRACT

A material composite has a part made from steel or a titanium-based material and a part made from a copper-based or aluminum-based material. The parts of the material composite are joined by way of an intermediate piece. The intermediate piece likewise comprises a region made from steel or a titanium-based material and a region made from a copper-based or aluminum-based material, which are connected by explosion welding. The parts of the material composite are connected to the regions of the intermediate piece which are in each case of the same type by means of a fusion or diffusion welding process.

8 Claims, 1 Drawing Sheet

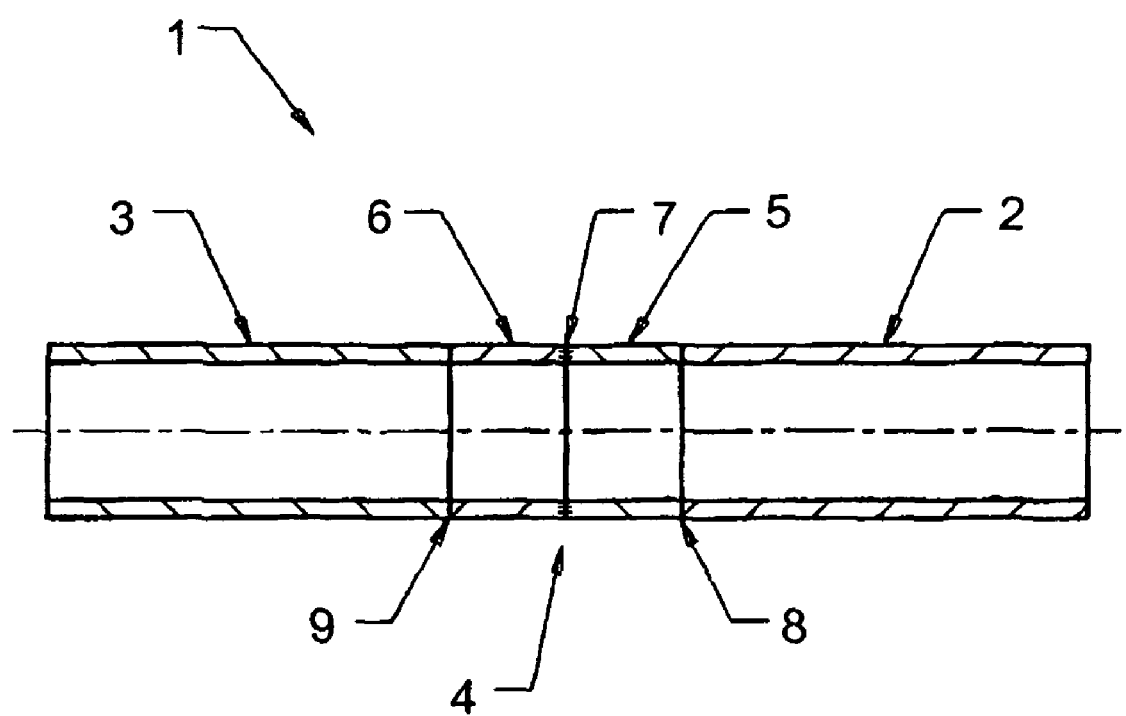

METHOD OF PRODUCING A MATERIAL COMPOSITE WITH EXPLOSION-WELDED INTERMEDIATE PIECE

CROSS-REFERENCE TO RELATED APPLICATIONS

This application claims the priority, under 35 U.S.C. §119, of Austrian application GM 615/2005, filed Sep. 13, 2005; the prior application is herewith incorporated by reference in its entirety.

BACKGROUND OF THE INVENTION

Field of the Invention

The invention relates to a process for producing a material composite and to such a composite, which comprises a part made from steel or a titanium-based material and a part made from a copper-based or aluminum-based material.

Copper-based or aluminum-based materials cannot be directly connected to steel or titanium-based materials by way of fusion welding processes. In the text which follows, the term "-based materials" is in each case to be understood as meaning alloys with a base metal content of >50% by weight. The term steel comprises the entire family of steel materials.

One important application area for composite materials which comprise a part made from steel or a titanium-based material and a part made from a copper-based or aluminum-based material is cooling components. Copper and aluminum are used on account of their superior thermal conductivity. To achieve a sufficient structural strength, the copper or aluminum parts are connected to a structural material, usually steel or a titanium material.

Steel/copper material composites are used, for example, as parts of first wall components of fusion reactors. The development of first wall components, in particular for the regions of very high energy densities, such as for example the diverter, baffle and limiter regions, represents a key component of the technological realization of fusion research. Extensive development programs have been carried out aimed at cohesively connecting these materials.

For example, the following solutions are known specifically for steel/copper material composites:
- welding in a Ni adaptor between the copper-based material and the steel;
- sealing the transition by a layer applied by electroplating;
- diffusion welding
- soldering.

Soldered connections have drawbacks with regard to corrosion resistance and strength. The strength of connections produced by way of diffusion welding is in many cases also inadequate. Moreover, it is extremely difficult to establish the required process consistency. Moreover, the connections have very diverse and also low strength properties. Welding in a Ni adapter between the copper-based material and the steel is also disadvantageous, as thermal loading tests have demonstrated. For example, this transition is susceptible to localized flow in the region of the Ni adapter.

SUMMARY OF THE INVENTION

It is accordingly an object of the invention to provide a material composite with an explosion-welded intermediate piece, which overcomes the above-mentioned disadvantages of the heretofore-known devices and methods of this general type and which provide for material composites that have a sufficient functionality, specifically with regard to strength, thermal fatigue, and corrosion resistance.

With the foregoing and other objects in view there is provided, in accordance with the invention, a method of producing a material composite having a first part made from steel or a titanium-based material and a second part made from a copper-based or aluminum-based material, the method which comprises:

producing an intermediate piece consisting of a first region made from steel or titanium-based material and a second region made from a copper-based or aluminum-based material, the first and second regions being connected by explosion welding forming a joining zone;

connecting the first part made from steel or a titanium-based material to the first region made from steel or titanium-based material by way of a fusion or diffusion welding process so as to form a joining zone;

connecting the second part made from a copper-based or aluminum-based material to the second region made from the copper-based or aluminum-based material, by way of a fusion or diffusion welding process so as to form a joining zone;

wherein the first part and the first region consist of materials comprising the same base metal, and the second part and the second region consist of materials comprising the same base metal.

First, an intermediate piece is produced, comprising a region made from steel or a titanium-based material and a region made from a copper-based or aluminum-based material, which are connected by explosion welding. This can, in a simple manner be implemented by using metal sheets/plates made from the materials in question. Since copper and aluminum are more ductile than steel and titanium and also have a lower yield strength, it is more favorable for the copper or aluminum sheet/plate to be positioned on the steel or titanium sheet/plate. The explosive is then applied to the copper or aluminum sheet/plate. As is typical for explosion-welded connections, a wavy, dentate joining zone with a high strength is formed. Intermediate pieces with a suitable geometry can be machined out of the composite produced in this way by mechanical processes or beam processes.

Then, the parts of the composite material are connected to the corresponding regions of the intermediate piece by means of a fusion or diffusion welding process. In this context, the term corresponding means that the part of the material composite and the region of the intermediate piece which is joined to it are made from materials of the same type. In this context, the term of the same type is to be understood as meaning that they consist of the same base material, i.e. for example the part made from copper-based material and region made from copper-based material or the part made from steel and the region made from steel.

Therefore, to produce a material composite, for example comprising steel and a copper-based material, first of all an intermediate piece made from steel and a copper-based material is produced by means of explosion welding. Subsequently, a steel part is connected to the steel region of the intermediate piece and a part made from a copper-based material is connected to the region of the intermediate piece made from a copper-based material, by a fusion or diffusion welding process. The steel of the intermediate piece may have a different structure and/or composition from the steel of the remaining material composite or, preferably, may have the same structure and/or composition. The same applies analogously to the copper-based material.

It is in a similar way possible to produce material composites comprising:

steel/aluminum-based material
titanium-based material/copper-based material, and
titanium-based material/aluminum-based material.

It is in this context in each case advantageous if the respective region of the intermediate piece and the respective part of the material composite have an identical or similar composition. Especially in the case of steel, with its wide range of possible microstructures, a similar microstructure is also advantageous.

It is advantageous to use work-hardened materials, such as for example particle-hardened copper alloys (e.g. Cu—Cr—Zr) or alloyed steels (e.g.: austenitic steels, such as 316L), for the material composite. Therefore, the respective material regions of the intermediate piece (e.g. Cu—Cr—Zr/316L) have a sufficiently high flow limit. There is therefore no low-strength transition which can fail as a result of localized flow. Stretching which occurs as a result of stresses can therefore be absorbed over a larger region or are dealt with by the parts of the material composite. Furthermore, explosion welding represents a cost-effective and established process for all combinations of materials. The explosion-welded connection can be subjected to nondestructive testing. Since the connection between the regions of the intermediate piece and the parts of the material composite consists of in each case materials of the same type, it is possible to use fusion welding or diffusion welding processes. Particular examples of fusion welding processes which can be used include TIG, laser and electron beam welding.

For applications in the region of the first wall, a further advantage is that the requirement that the relative magnetic permeability be as low as possible is met, since the use of nickel is avoided.

For use as a cooling component, it is advantageous if the intermediate piece is designed as a tube section and the parts of the composite material are designed in the form of a tube. The intermediate piece designed as a tube section is in this case likewise machined out of a composite plate produced by means of explosion welding, with the axial extent of the tube section corresponding to the thickness of the composite plate.

It has been possible to achieve particularly advantageous results for material composites made from steel/copper-based material. From the wide range of steel grades, the austenitic or partially austenitic steels are particularly worthy of mention. Particle-hardened copper alloys, such as for example the precipitation-hardened copper alloy Cu—Cr—Zr, have proven suitable copper-based materials. The process according to the invention can particularly advantageously be used to produce first wall components or parts of first wall components of a fusion reactor.

In the text which follows, the invention is explained on the basis of a material composite made up of steel/copper-based material. However, it is in a similar way possible to produce further material composites according to the invention.

The construction and method of operation of the invention, however, together with additional objects and advantages thereof will be best understood from the following description of specific embodiments when read in connection with the accompanying drawings.

Other features which are considered as characteristic for the invention are set forth in the appended claims.

Although the invention is illustrated and described herein as embodied in a material composite with explosion-welded intermediate piece, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of a specific embodiment when read in connection with the accompanying drawing.

BRIEF DESCRIPTION OF THE DRAWINGS

The sole FIGURE shows a section through a material composite that is tubular in form.

DESCRIPTION OF THE PREFERRED EMBODIMENTS

Example

A tubular material composite 1 was produced from Cu—Cr—Zr/316L (austenitic steel). Composite materials of this type are used as heat exchangers in the diverter of a fusion reactor.

For this purpose, a plate made from Cu—Cr—Zr in the solution-annealed, quenched state was connected to a plate made from 316L by explosion welding. The two plates had a surface area of in each case 500×500 mm$^2$ and a thickness of in each case 15 mm. For the explosion welding, the Cu—Cr—Zr plate was used as the "flyer." For this purpose, the explosive was positioned on the top side of the Cu—Cr—Zr plate and ignited, resulting in the formation of the joining zone 7.

After the welding, the plate composite was subjected to ultrasound testing. It was in this way possible to locate bonded and unbonded regions. Then, an intermediate piece 4 in the form of a slug was cut out of the plate from the bonded region by means of water jet cutting, in such a manner that the slug axis was normal to the explosion-welded connecting surface 7. The slug 4 had a diameter of 15 mm and a height of 30 mm. The steel region 5 and the Cu—Cr—Zr region 6 in each case had a thickness of 15 mm. The explosion welding 7 had the wavy form typical of this connecting process.

The two ends of this slug 4 were machined by turning so as to form a step with a depth of 5 mm and a diameter of 12 mm. The step in the Cu—Cr—Zr region 6 serves, during the subsequent assembly with the Cu—Cr—Zr part 3 of the material composite, which is designed in the form of a tube with Ø 15×1.5 mm, as a centering means for the electron beam welding. The same principle is fulfilled by the step in the 316L-side region 5.

A steel tube 2 made from 316L was positioned in the centering of the region 5, and a Cu—Cr—Zr tube 3 was positioned in the centering of the region 6. The assembly obtained in this way was then cohesively connected by means of electron beam welding, with a peripheral weld seam 9 located in the Cu—Cr—Zr and a further peripheral weld seam 8 located in the 316L. The welded composite was then age-hardened at 475° C./3 h and machined, so as to form a composite tube 1 with an external diameter of 15 mm and a wall thickness of 1.5 mm. The tests which were subsequently carried out, such as helium leak test, dye penetration test and X-ray examination, revealed intact joining zones. During the tensile test, failure occurred in the Cu—Cr—Zr tube. This demonstrates that the explosion weld and also the electron beam welds have higher strengths than the Cu—Cr—Zr.

We claim:

1. A method of producing a material composite having a first tube made from steel and a second tube made from a copper-based material, the method which comprises:

producing a tube section consisting of a first region made from steel and a second region made from a copper-based material, the first and second regions being connected by explosion welding forming a joining zone;

connecting the first tube made from steel to the first region made from steel by way of a fusion or diffusion welding process so as to form a joining zone; and connecting the second tube made from a copper-based material to the second region made from the copper-based material, by way of a fusion or diffusion welding process so as to form a joining zone.

2. The method according to claim 1, which comprises connecting a metal sheet made from a copper-based material to a metal sheet made from steel by explosion welding to form a composite, and machining the-tube section out of the composite.

3. The method according to claim 1, which comprises connecting the first tube to the first region and connecting the second tube to the second region by TIG, laser or electron beam welding.

4. The method according to claim 1, wherein the steel of the first region, at least in regions thereof, has an austenitic microstructure.

5. The method according to claim 1, wherein the copper-based material is a particle-hardened material.

6. The method according to claim 5, wherein the copper-based material is Cu—Cr—Zr.

7. The method according to claim 1, which comprises forming the material composite as a first wall component or as a part of a first wall component of a fusion reactor.

8. The method according to claim 1, which comprises forming the first tube, the second tube, and the tube section with a substantially common diameter and connecting the first tube, the tube section, and the second tube to one another to form a substantially continuous tube with the common diameter.

* * * * *